(12) United States Patent
Thaler et al.

(10) Patent No.: US 11,186,029 B2
(45) Date of Patent: Nov. 30, 2021

(54) DEEP-DRAWING APPARATUS AND METHOD FOR THE DEEP-DRAWING OF FOIL

(71) Applicant: Harro Hoefliger Verpackungsmaschinen GmbH, Allmersbach im Tal (DE)

(72) Inventors: Andreas Thaler, Allmersbach im Tal (DE); Udo Egelkraut, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 188 days.

(21) Appl. No.: 16/547,200

(22) Filed: Aug. 21, 2019

(65) Prior Publication Data

US 2020/0061900 A1    Feb. 27, 2020

(30) Foreign Application Priority Data

Aug. 24, 2018 (EP) .................................... 18190724

(51) Int. Cl.
     *B29C 51/08*      (2006.01)
     *B29C 51/36*      (2006.01)
     *B29C 51/10*      (2006.01)
     *B29K 29/00*      (2006.01)

(52) U.S. Cl.
CPC ............ *B29C 51/082* (2013.01); *B29C 51/10* (2013.01); *B29C 51/36* (2013.01); *B29C 2791/006* (2013.01); *B29C 2791/007* (2013.01); *B29K 2029/04* (2013.01)

(58) Field of Classification Search
None
See application file for complete search history.

(56) References Cited

U.S. PATENT DOCUMENTS

| | | |
|---|---|---|
| 5,044,919 A | 9/1991 | Hama et al. |
| 5,529,654 A | 6/1996 | Kavanagh et al. |

FOREIGN PATENT DOCUMENTS

| | | |
|---|---|---|
| DE | 1246217 B | 8/1967 |

*Primary Examiner* — Monica A Huson
(74) *Attorney, Agent, or Firm* — Walter Ottesen, P.A.

(57) ABSTRACT

A deep-drawing apparatus includes an arrangement of die plates, wherein each die plate has a plurality of frame vacuum holes and at least one female die having at least one die vacuum hole. At least one vacuum channel connects a vacuum source to the die vacuum hole of the female die and to the frame vacuum holes of the die plate. The deep-drawing apparatus includes for each die plate a closing device for closing and opening the vacuum channel. The die plate is fed a single foil sheet. The closing device opens the connecting channel at the corresponding die plate and the foil sheet is laid onto the die plate. Thereafter, the foil is held on the frame vacuum holes by a holding vacuum and is deep-drawn by a deep-drawing vacuum at the die vacuum holes in the female die. A method for the deep-drawing of foil is also disclosed.

9 Claims, 2 Drawing Sheets

DEEP-DRAWING APPARATUS AND METHOD FOR THE DEEP-DRAWING OF FOIL

CROSS REFERENCE TO RELATED APPLICATION

This application claims priority of European patent application no. 18 190 724.7, filed Aug. 24, 2018, the entire content of which is incorporated herein by reference.

BACKGROUND OF THE INVENTION

For the deep-drawing of foil, in particular of individual foil sheets, deep-drawing apparatuses which deform the sheets via a deep-drawing vacuum are known. The deep-drawing apparatuses include a circumferential, closed arrangement of die plates, which are moved, for instance, via a chain drive. The die plates are drawn, in a row, over a vacuum delivery apparatus. The vacuum delivery apparatus is configured such that a multiplicity of dies simultaneously slide along on the vacuum delivery apparatus and are hereupon supplied with vacuum. The die plates are fluidically connected to the vacuum delivery apparatus via channels, so that the air is extracted at the female dies of the die plate through die vacuum holes. Moreover, on the die plates are configured frame vacuum holes, which are likewise connected to the vacuum delivery apparatus via appropriate channels. For the deformation of a foil sheet, this is laid onto a die plate. Via the vacuum delivery apparatus, air is extracted at the frame vacuum holes. The foil sheet is hereupon sucked onto the frame vacuum holes and secured on the die plate. As a result of the underpressure present at the female die, the foil is drawn into the female die and deformed.

A drawback with deep-drawing apparatuses of this type is that they have hitherto been unable to be operated with a fully furnished die arrangement, but only with a partially furnished die arrangement. The partially furnished die arrangement contains, in addition to the die plates, so-called dummy plates, which do not tap any underpressure from the vacuum delivery apparatus. This is due to the need for a secure vacuum guidance. The associated vacuum delivery apparatus is typically configured such that it accompanies the complete cycle from the supply of foil, through to the heating, deep-drawing and, where appropriate, also filling and sealing. From the start through to the end of the process steps, a holding vacuum must be applied, via the frame vacuum holes, to the borders. In the female dies must initially be applied, through die vacuum holes, a higher deep-drawing vacuum, which, subsequent to the deep-drawing, is replaced by the holding vacuum. In order to achieve this, it is necessary, however, to avoid a situation in which a die plate finds itself without on-lying foil over the vacuum delivery apparatus. In such a case, ambient air would be sucked up, with virtually no resistance, through the then exposed holes. As a consequence, the underpressure in the vacuum delivery apparatus would be lost, whereby the process steps at the other die plates would be hampered.

The vacuum delivery apparatus usually extends over a length corresponding to around 40 percent of the peripheral length of the chain of die plates. In extremis, for instance at the start-up of the process, this 40 percent of die plates, in the case of a fully furnished chain, would be without cover. Through the associated vacuum holes, too much infiltrated air would be drawn. Consequently, a partially furnished die arrangement of known deep-drawing apparatuses consists of die plates only to the tune of around 60 percent. The remaining approximately 40 percent are formed by dummy plates without connection to the vacuum delivery apparatus, in order, in particular, to enable a start-up, and also an empty running of the process, without loss of vacuum result from uncovered die plates. The dummy plates are not, however, suitable for the deep-drawing of foil, which has a negative effect on the capacity utilization of deep-drawing apparatuses of this type.

SUMMARY OF THE INVENTION

It is an object of the invention to provide a deep-drawing apparatus such that the capacity utilization of the deep-drawing apparatus is improved.

This object can, for example, be achieved by a deep-drawing apparatus for the deep-drawing of foil, The deep-drawing apparatus includes: a chain; a drive unit; an assembly of a plurality of die plates configured to be driven via the chain in a circulatory path by the drive unit; each of the plurality of die plates defining a plurality of frame vacuum holes and having at least one female die defining at least one die vacuum hole; at least one vacuum source configured to provide a vacuum; a plurality of vacuum channels, wherein each of the die plates has at least one vacuum channel associated therewith, wherein each of the vacuum channels is configured to connect the vacuum source to corresponding ones of the at least one die vacuum hole of the corresponding one of the at least one female die and to the plurality of frame vacuum holes of the corresponding one of the die plates; and, a plurality of closing devices, wherein each of the plurality of die plates has a closing device associated therewith for closing and opening the corresponding one of the at least one vacuum channel.

It is a further object of the invention to define a method for operating the deep-drawing apparatus via which the utilization capacity of the deep-drawing apparatus can be improved.

This object can, for example, be achieved by a method for the deep-drawing of foil for the production of foil packages with an apparatus, wherein the apparatus includes: a chain; a drive unit; an assembly of a plurality of die plates configured to be driven via the chain in a circulatory path by the drive unit; each of the plurality of die plates defining a plurality of frame vacuum holes and having at least one female die defining at least one die vacuum hole; at least one vacuum source configured to provide a vacuum; a plurality of vacuum channels, wherein each of the die plates has at least one vacuum channel associated therewith, wherein each of the vacuum channels is configured to connect the vacuum source to corresponding ones of the at least one die vacuum hole of the corresponding one of the at least one female die and to the plurality of frame vacuum holes of the corresponding one of the die plates; and, a plurality of closing devices, wherein each of the plurality of die plates has a closing device associated therewith for closing and opening the corresponding one of the at least one vacuum channel. The method includes the steps of: feeding a die plate a single foil sheet, wherein the closing device opens the corresponding at least one vacuum channel; opening the at least one vacuum channel to the corresponding die plate starting from a closed setting; applying the foil sheet onto the die plate following the opening of the at least one vacuum channel; and, holding the foil on the frame vacuum holes of the corresponding die plate via a holding vacuum and deep-drawing the foil via a deep-drawing vacuum at the die vacuum holes of the corresponding female die.

The deep-drawing apparatus for the deep-drawing of foil includes at least one vacuum channel for each die plate. At least one vacuum channel connects at least one vacuum source to the die vacuum hole of the female die. Moreover, at least one vacuum channel connects at least one vacuum source to the frame vacuum holes of the die plate. The deep-drawing apparatus includes for each die plate a closing device for closing and opening the at least one vacuum channel.

The closing device serves to close and to open the at least one vacuum channel, thus the connection between the vacuum delivery apparatus and the die plate, according to need. Consequently, the closing device can shut off from or release to the die plate the underpressure generated by the vacuum delivery apparatus. If the closing device is open, an underpressure, starting from the vacuum delivery apparatus via the at least one vacuum channel, is present at the vacuum openings of the female die and/or at the frame vacuum holes. If the closing device is in the closed setting, it shuts off the relevant vacuum channel, so that the underpressure does not make its way to the assigned vacuum holes.

During the operation of the deep-drawing apparatus, a single foil sheet is fed to the die plate. Starting from a closed setting, the closing device switches into an open setting and opens the at least one connecting channel on the appropriate die plate. Following opening of the at least one connecting channel, the foil sheet is laid onto the die plate. The underpressure generated by the vacuum delivery apparatus makes its way through the relevant vacuum channel toward the frame vacuum holes, so that the foil sheet is sucked up at the frame vacuum holes and held via a holding vacuum. The foil sheet is here stretched over the female die and substantially hermetically seals this. Analogously thereto, an underpressure is also present at the vacuum opening of the female die, which underpressure draws the foil sheet, which is held on the frame vacuum holes, into the female die and subsequently holds it there with reduced level. If the foil sheet, following the deep-drawing process, is removed again from the female die, the closing device is returned into the closed setting. It is thereby avoided that the vacuum delivery apparatus sucks up air and the underpressure drops.

When the deep-drawing apparatus is started up, the closing devices of all die plates are first of all in the closed state. Before a first foil sheet is laid onto a first die plate, the closing device thereof is initially opened. The underpressure present at the vacuum opening and at the frame vacuum holes is sufficiently large to suck up the foil sheet, to hermetically seal it, and to hold it at the borders. Following the deep-drawing, the deep-drawn foil sheet closes off, in addition to the frame vacuum holes, also the die vacuum hole of the female die, so that at no place is underpressure unduly lost. Rather, a correspondingly large underpressure can be built back up. In the simplest case of normal operation, the closing device of the first die plate remains open. When a further foil sheet is respectively laid onto in each case a following die plate, only the closing device thereof is opened, whereupon a build-up of vacuum and a sealing of the vacuum holes follow in the same way. Through the needs-based switching of the closing device of the die plates, the necessary underpressure can be maintained throughout the system. A start-up in a fully furnished die arrangement can thereby be enabled without the use of dummy plates. The utilization of production capacity can be increased by around 40%.

In addition, further possibilities emerge from the disclosure. For example, although a full furnishment of the chain with sizing plates is possible, it is not absolutely necessary. The system can also be operated on a need-dependent basis with just individual sizing plates. The set-up complexity is herein considerably reduced. Moreover, a plurality of different sizing plates can be fitted simultaneously on the chain and, depending on the formulation, activated and deactivated on a targeted basis. In addition, the possibility exists of closing the die plates after the deep-drawing, for example in the event of a faulty process step.

Preferably, the deep-drawing apparatus can have two vacuum channels and two vacuum sources. The at least one die vacuum hole 24 and the one vacuum source 31 are connected in a flow-conducting manner by means of the one vacuum channel. The frame vacuum holes and the other vacuum source can be fluidically connected to the vacuum delivery apparatus by means of the other vacuum channel. Both vacuum channels are closable and openable by means of the closing device. As a result of the separate configuration of the vacuum channels, the frame vacuum holes and the vacuum openings can be variously actuated and correspondingly supplied with underpressure. As a result, a supply with a comparatively low holding underpressure and with a relatively higher deep-drawing underpressure can, for instance, be realized.

It can advantageously be provided that the closing device includes a slider element, which is displaceable into a closed setting and into an open setting of the at least one vacuum channel or of the vacuum channels. Furthermore, the slider element can preferably be mounted between a carrier plate of the deep-drawing apparatus and the die plate via a first sliding element and a second sliding element. The slider element can advantageously be realized as a slider plate. The closing device has the function of a shutoff valve, which shuts off and opens the flow cross section of the vacuum channels. As a result of the configuration of the slider element as a slider plate, a comparatively flat construction of the closing device can be realized. As a result of the sliding elements, the slider element is mounted so that, through the reduction of the friction, a rapid switching movement of the slider element can be realized. Moreover, the wear between slider element, carrier plate and die plate can be avoided.

The slider element may preferably have latching openings, which, in the closed setting and the open setting, latch with resilient pressure elements of the deep-drawing apparatus. As a result, the slider element is held in a defined manner in its respective end positions, in discrete switch settings.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
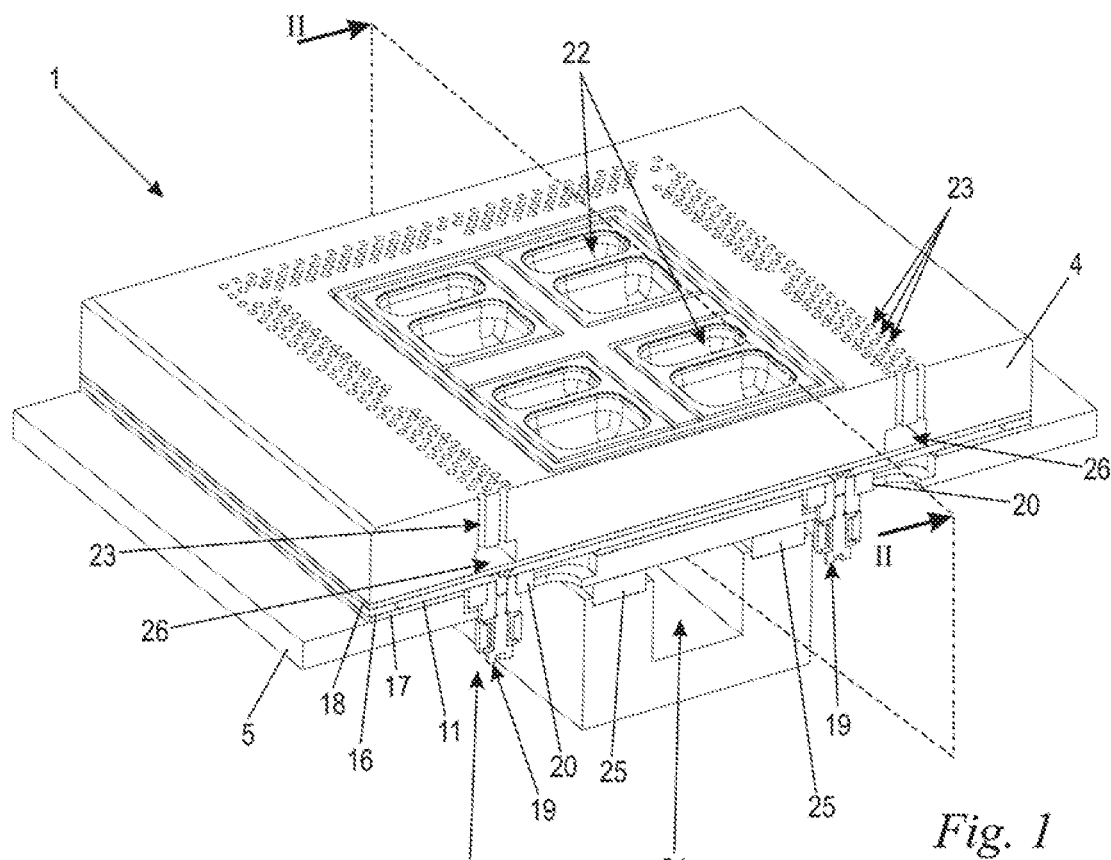
FIG. 1 shows in a perspective sectional representation a deep-drawing apparatus having a closing device for vacuum channels, which are shown in greater detail in FIG. 2.

FIG. 1 shows a detail of a deep-drawing apparatus for the production of foil packages in a sectioned, perspective view.

The deep-drawing apparatus 1 serves for the deep-drawing of foil and is part of a packaging machine (not shown here) for the production of foil packages. Packages of this type are made of plastics foil, which is provided in the form of foil webs or, as in the illustrative embodiment, in the form of individual foil sheets. As the foil material for packages, water-soluble plastics such as polyvinyl alcohol (PVOH) are particularly suitable, but also water-insoluble plastics can be used for the production of such packages. The packages can be used, for instance, for cleaning agents or detergents both in powdery and in high-viscosity (gel) and low-viscosity liquid form. Packages which are deep-drawn according to the disclosure and are made of suitable foil materials are likewise suitable for use in the pharmaceutical sector for the packaging of medicines. The foils are deep-drawn in the packaging machine, via the deep-drawing apparatus, by vacuum into an appropriate packaging form, for instance into a bag form. After this, the packaging form is filled with the product to be packed and is sealed with a further foil. Subsequently, in a final method step, the filled foil packaging is separated out from the foil sheets or from the foil web by means of a cutting apparatus.

The deep-drawing apparatus 1 includes an arrangement of a plurality of die plates 4. The arrangement has at least 10, in particular at least 20, preferredly around 40 die plates, or more, which are arranged one to another in a circumferential row and are revolvingly driven by a chain. Irrespective of the length of the chain, the number of die plates 4 can be chosen such that a full furnishment exists. As shown in FIG. 1, the die plate 4 is fastened on a carrier plate 5. The deep-drawing apparatus 1 includes a vacuum delivery apparatus, which includes at least one, here two, vacuum sources 31, 32 indicated in FIG. 2. The vacuum delivery apparatus includes a supply channel 21 running in the longitudinal direction, and slide rails 25 likewise running in the longitudinal direction, on which the carrier plate 5 rests. Accordingly, the supply channel 21 of U-shaped cross section is upwardly bounded by the slide rails 25 and the carrier plate 5. During the operation of the deep-drawing apparatus 1, a holding vacuum or a holding underpressure, which is provided via the vacuum source 32 shown in FIG. 2, is present in the supply channel 21.

The deep-drawing apparatus 1 has a closing device 10 for each die plate 4. The closing device 10 is fastened on the carrier plate 5, wherein the die plate 4 is in turn disposed on the closing device 10. Underpressure from the vacuum delivery apparatus is connected up to the die plate 4 or shut off via the closing device 10. The closing device 10 is switched by a displacement unit 19 either into an open setting or into a closed setting. In the open setting, underpressure from the vacuum delivery apparatus is provided to the die plate 4. If the closing device 10 is in the closed setting, the die plate 4 is not supplied with underpressure.

As shown in FIG. 1, the die plate 4 includes at least one, here a plurality of female dies 22. In the illustrative embodiment, the female dies 22 and the die plate 4 are of one-part configuration. It can also be expedient to form the female dies 22 and the die plate 4 in multipart configuration, so that an exchange of the female dies 22 can be made in a simple manner. In the illustrative embodiment, the die plate includes four female dies 22, wherein a different number of female dies 22 per die plate 4 can also be expedient. The female dies 22 are arranged approximately in the center of the die plate 4. Moreover, the die plate 4 has a multiplicity of frame vacuum holes 23, which are arranged running around the female dies 22. The frame vacuum holes 23 open out into a frame channel 26, which connects all frame holes 23 one to another.

Figure 2:
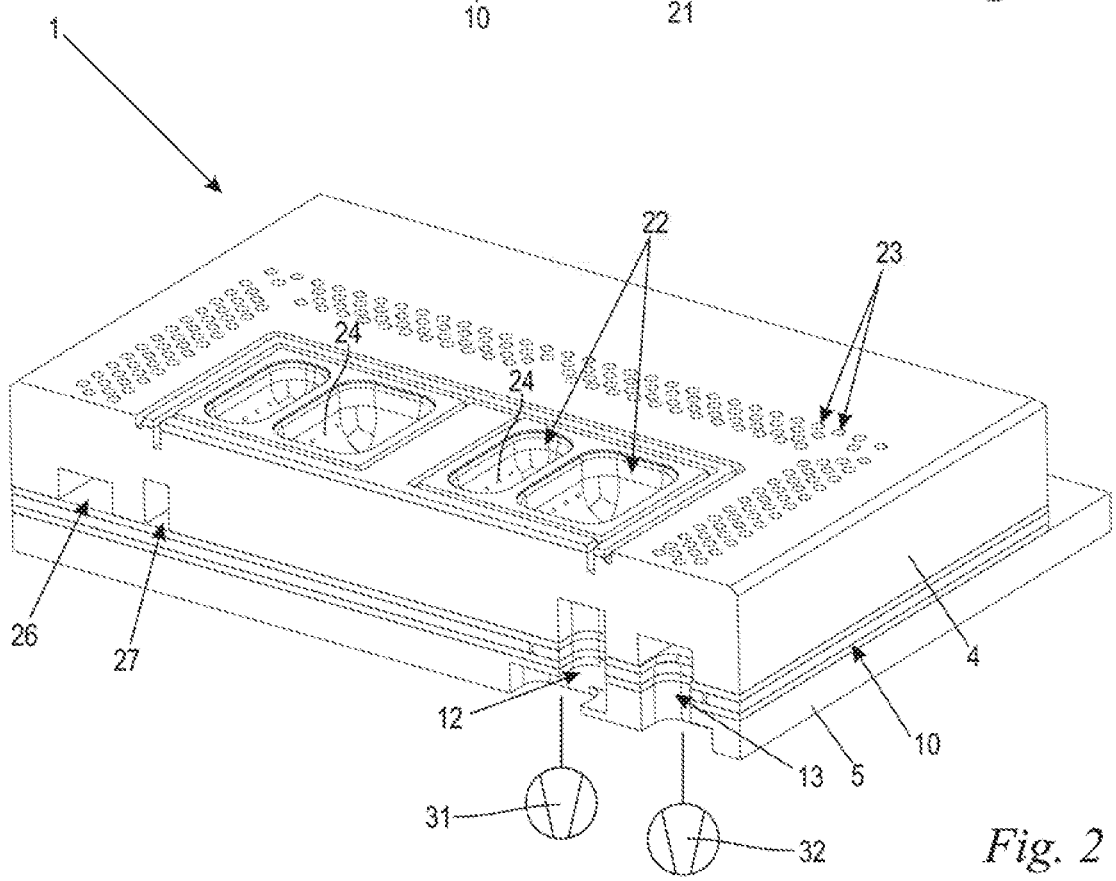
FIG. 2 shows in a perspective sectional representation the deep-drawing apparatus in the direction of the arrow II according to FIG. 1, with details of the configuration of the closing device; and, FIG. 3 shows in a perspective representation the closing device, with a slider plate of the deep-drawing apparatus according to FIGS. 1 and 2.

In FIG. 2, the deep-drawing apparatus 1 according to an embodiment of the invention is shown in perspective representation in the direction of the arrow II according to FIG. 1. That configuration which comes into effect in the laying and deep-drawing of the foil is shown. The arrangement includes at least one vacuum channel, here a first vacuum channel 12 and a second vacuum channel 13. In the shown deep-drawing configuration, the first vacuum channel 12, starting from the first vacuum source 31, runs through the carrier plate 5 over the closing device 10 into the die plate 4. Within the die plate 4, the first vacuum channel 12 opens out into a die channel 27. The female dies 22 have per mold cavity respectively at least one, here a plurality of die vacuum holes 24, which, starting from the respective female die 22, open out into the die channel 27. Accordingly, the female dies, in the opened setting of the closing device 10, are connected in a pressure-transmitting and flow-transmitting manner, via the die vacuum holes 24, the die channel 27 and the first vacuum channel 12, to the first vacuum source 31.

Starting from the second vacuum source 32, the second vacuum channel 13 runs through the carrier plate 5 over the closing device 10 and opens out into the frame channel 26. Accordingly, the frame vacuum holes 23, in the opened setting of the closing device 10, are connected in a pressure-transmitting and flow-transmitting manner, via the frame channel 26 and the second vacuum channel 13, to the second vacuum source 32.

Figure 3:
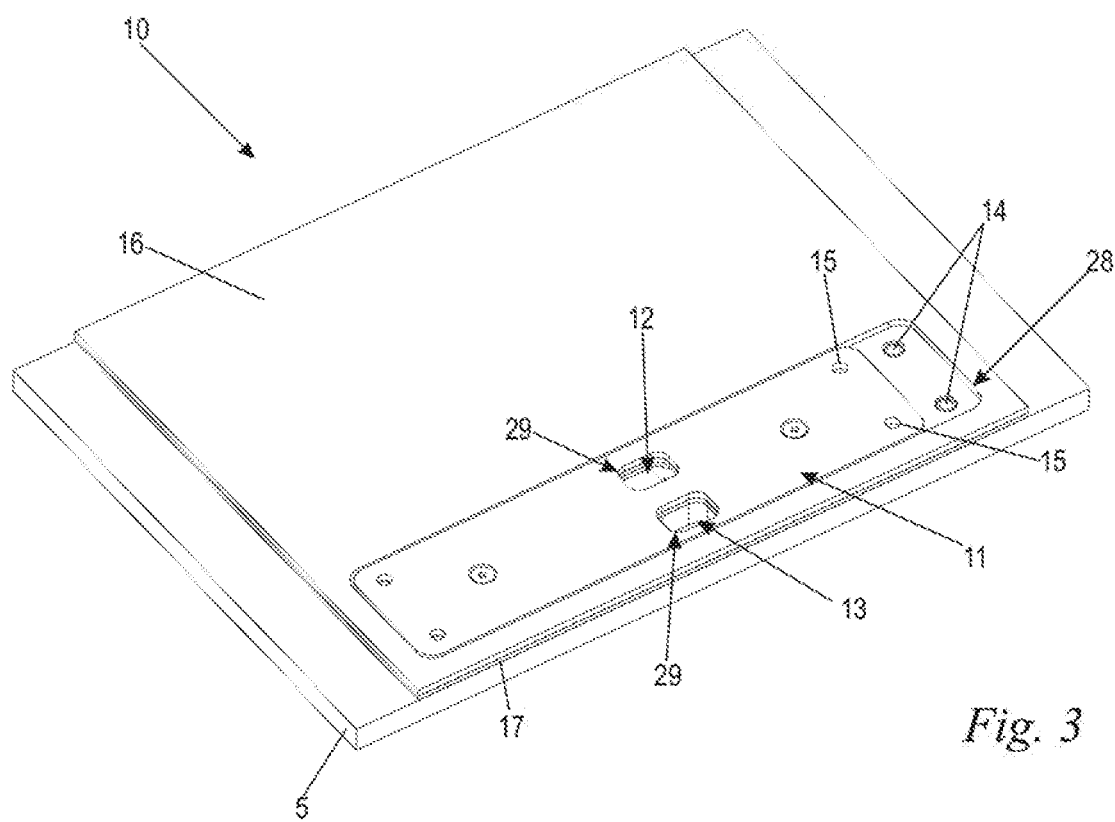

In FIG. 3, a perspective representation of the closing device 10 is shown. The closing device 10 includes a frame plate 16, having an elongate opening 28, and a slider element 11, which is guided in the opening 28 of the frame plate 16. In the illustrative embodiment, the slider element 11 is realized as a slider plate and possesses barely the same thickness as the frame plate 16. For reasons of displaceability, whilst at the same time maintaining leak-tightness, the slider plate has, in terms of its thickness in relation to the frame plate 16, a small undermeasure of just a few hundredths of millimeters. The closing device 10 includes a first sliding or gliding element 17, which in the illustrative embodiment is configured as a slide plate and is disposed between the carrier plate 5 and the frame plate 16. Moreover, the closing device 10 includes a second sliding or gliding element 18 (FIGS. 1 and 2), which is disposed between the frame plate 16 and the die plate 4. The slider element 11 is thus linearly mounted, in the opening 28 of the frame plate 16, between the first sliding element 17 and the second sliding element 18.

As shown in FIG. 3, the slider element 11 has per vacuum channel 12, 13 a slider opening 29. The opening cross section of the slider openings 29 corresponds to the cross section of the first vacuum channel 12 and of the second vacuum channel 13. If the closing device 10 is switched in the opened setting, the slider openings 29 lie coaxially to the first vacuum channel 12 and the second vacuum channel 13. The first vacuum channel 12 and the second vacuum channel 13 are opened, so that the vacuum delivery apparatus is connected in a pressure-transmitting and flow-transmitting manner to the frame vacuum holes 23 and the vacuum openings of the female dies 22 and an underpressure is provided. If the slider element 11 is moved by the displacement unit 19 into the closed setting of the closing device 10, the slider openings 29 lie offset from the first vacuum channel 12 and the second vacuum channel 13. As a result, the air through-flow and the underpressure transmission of the first vacuum channel 12 and of the second vacuum channel 13 are shut off by the slider element 11. At the frame vacuum holes 23 and the vacuum openings of the female dies 22, no underpressure is present.

As shown in FIG. 3, the slider element 11 includes latching openings 15, which, in the discrete end settings of the closing device 10, thus in the open setting and the closed setting, latch with resilient pressure elements 14. The resilient pressure elements 14 are fastened to the carrier plate 5, project through the first sliding element 17 and engage in the latching openings 15 of the slider element 11. In order to release a latching between the slider element 11 and the resilient pressure elements 14, a minimum displacement force of the displacement unit 19 is necessary in order to force the resilient pressure elements 14 back out of the latching openings. As a result of the latching between the slider element 11 and the resilient pressure elements 14, the slider element 11, in the discrete end settings, is secured against unwanted displacement movements.

By the following description of the method steps, the mode of operation of the closing device 10 shall be made clear:

At the beginning of a processing cycle, all die plates 4 are exposed. None of them are covered with foil. In at least those die plates 4 which lie within the effective range of the vacuum delivery apparatus, the respective closing device 10 is closed to enable an underpressure to build up in the vacuum delivery apparatus. Upon start-up of the machine and prior to laying of a first foil sheet, the closing device 10 of the first die plate, starting from a closed setting, switches into an open setting. The slider element 11 is here slid by means of the displacement unit 19 into the open setting, whereby the slider openings 29 are arranged coaxially to the vacuum channels 12, 13. The vacuum sources 31, 32 are connected in a pressure-transmitting and flow-transmitting manner to the vacuum openings of the female dies 22 and to the frame vacuum holes 23. The underpressure emanating from the second vacuum source 32 makes its way through the second vacuum channel 13 to the frame vacuum holes 23. After the second connecting channel 13 has thus been opened, the foil sheet is laid onto the die plate 4. The foil sheet is now sucked up at the frame vacuum holes 23 and is held via a holding vacuum. The foil sheet here stretches over the female dies 22 and substantially hermetically seals these. In addition, in the open setting of the closing device 10, an underpressure is also present at the die vacuum holes 24 of the female dies 22. This underpressure provided by the first vacuum source 31 has as the deep-drawing vacuum a higher differential pressure relative to the ambient pressure than the comparatively less pronounced holding vacuum of the frame vacuum holes 23. In the deep-drawing configuration according to FIG. 2, the deep-drawing vacuum draws the foil sheet, which is held on the frame vacuum holes 23, into the female die 22 and hence effects a deep-drawing, plastic deformation of the foil.

Following the deep-drawing, the die plates 4 are transported onward to following processing stations, for instance for filling and sealing. Right up to the last processing station, the supply channel 21 herein comes into effect. By this means, a pressure-transmitting and flow-transmitting connection both of the frame vacuum holes 23 and of the die vacuum holes 24 to the second vacuum source 32 can be established. Following the conclusion of the deep-drawing operation, at the frame vacuum holes 23, and also at the die vacuum holes 24, only the comparatively small holding vacuum is then still active. The frame vacuum holes 23, and also the die vacuum holes 24, herein remain covered by the foil, so that the vacuum does not collapse.

Following die plates 4 are successively activated one after the other, analogously to the above-described first die plate 4, until all active die plates within the effective range of the vacuum delivery apparatus have been put into operation. The then continuing foil coverage of the frame vacuum holes 23 and of the die vacuum holes 24 ensures a constant supply of underpressure, and hence a stable operation. The closing devices 10 of those die plates 4 which, after the last processing station, depart the effective range of the vacuum delivery apparatus do not necessarily have to be reclosed, since no connection to the vacuum sources 31, 32 any longer exists and consequently there is no negative reaction to the underpressure level. Nevertheless, not all die plates 4, however, have to be activated in the above-described manner. It can also be expedient to activate only a selection thereof, while the closing devices 10 of inactive die plates 4 can remain closed. This allows, for instance, the furnishment of the entire chain with two or more different types of die plates, of which, respectively, only those die plates 4 of a selected type are activated. Moreover, the possibility exists of switching off individual die plates 4 in the event of a fault, in order to avoid the intake of spurious air at the appropriate place.

Insofar as a processing cycle is now due to be ended, when, therefore, the deep-drawing apparatus is due to be run empty, the individual closing devices 10 are returned into the closed setting. The slider element 11 is here displaced by the displacement unit 19 back into the closed setting, whereby the slider element 11 closes off the vacuum channels 12, 13. The vacuum delivery apparatus is no longer fluidically connected to the frame vacuum holes 23 and to the vacuum openings of the female dies 22. It can thereby be ensured that the vacuum delivery apparatus does not suck up any air through die plates which have already been run empty. In this way, a reliable supply of underpressure can be ensured even at the last still active die plates, until the last finished foil package has finally been removed.

It is understood that the foregoing description is that of the preferred embodiments of the invention and that various changes and modifications may be made thereto without departing from the spirit and scope of the invention as defined in the appended claims.

What is claimed is:
1. A deep-drawing apparatus for the deep-drawing of foil, the deep-drawing apparatus comprising:
   a chain;
   a drive unit;
   an assembly of a plurality of die plates configured to be driven via said chain in a circulatory path by said drive unit;
   each of said plurality of die plates defining a plurality of frame vacuum holes and having at least one female die defining at least one die vacuum hole;
   at least one vacuum source configured to provide a vacuum;
   each of said die plates having at least one vacuum channel associated therewith;
   wherein said at least one vacuum channel for each of said die plates is configured to connect said at least one vacuum source to said at least one die vacuum hole and said plurality of frame vacuum holes of a corresponding one of said die plates; and,
   a plurality of closing devices, wherein each of said plurality of die plates has a closing device associated therewith for closing and opening the corresponding one of said at least one vacuum channel.

2. The deep-drawing apparatus of claim 1, wherein:
the deep-drawing apparatus has two vacuum sources;
each of said plurality of said die plates has a first vacuum channel and a second vacuum channel associated therewith;
said at least one die vacuum hole of each of said at least one female die and the vacuum source being connectable in a flow-conducting manner via the corresponding one of said first vacuum channels;
said frame vacuum holes of each of said die plates and said second vacuum source being fluidically connectable via the corresponding one of said second vacuum channels; and,
said first vacuum channel and said second vacuum channel being closable and openable via corresponding ones of said plurality of closing devices.

3. The deep-drawing apparatus of claim 1, wherein each of said closing devices has a slider element which is displaceable into a closed setting and into an open setting of said at least one vacuum channel.

4. The deep-drawing apparatus of claim 3 further comprising:
a carrier plate;
a first gliding element;
a second gliding element; and,
each of said slider elements being mounted between said carrier plate and the corresponding one of said plurality of die plates via said first gliding element and said second gliding element.

5. The deep-drawing apparatus of claim 3, wherein said slider element is a slider plate.

6. The deep-drawing apparatus of claim 1 further comprising:
a plurality of resilient pressure elements; and,
each of said closing devices having a slider element defining latching openings, which, in a closed setting and an open setting, latch with said resilient pressure elements of the deep-drawing apparatus.

7. The deep-drawing apparatus of claim 1 further comprising a feeding apparatus for feeding individual foil sheets onto individual ones of said plurality of die plates.

8. A method for the deep-drawing of foil for the production of foil packages with an apparatus, wherein the apparatus includes: a chain; a drive unit; an assembly of a plurality of die plates configured to be driven via said chain in a circulatory path by said drive unit; each of said plurality of die plates defining a plurality of frame vacuum holes and having at least one female die defining at least one die vacuum hole; at least one vacuum source configured to provide a vacuum; each of said die plates having at least one vacuum channel associated therewith, wherein said at least one vacuum channel for each of said die plates is configured to connect said at least one vacuum source to said at least one die vacuum hole and said plurality of frame vacuum holes of a corresponding one of said die plates, wherein each of said plurality of die plates has a closing device associated therewith for closing and opening the corresponding one of said at least one vacuum channel; the method comprising the steps of:
feeding a die plate a single foil sheet, wherein the closing device opens the corresponding said at least one vacuum channel;
opening the at least one vacuum channel to the corresponding die plate starting from a closed setting;
applying the foil sheet onto the die plate following said opening of the at least one vacuum channel; and,
holding the foil on the frame vacuum holes of the corresponding die plate via a holding vacuum and deep-drawing the foil via a deep-drawing vacuum at the die vacuum holes of the corresponding female die.

9. A deep-drawing apparatus for the deep-drawing of foil, the deep-drawing apparatus comprising:
a chain;
a drive unit;
a die plate configured to be driven via said chain in a circulatory path by said drive unit;
said die plate defining a plurality of frame vacuum holes and having at least one female die defining at least one die vacuum hole;
a vacuum source configured to provide a vacuum;
at least one vacuum channel for said die plate;
said vacuum channel being configured to connect said vacuum source to said at least one die vacuum hole of said female die and to said frame vacuum holes; and,
a closing device associated with said die plate for closing and opening said at least one vacuum channel.

* * * * *